United States Patent Office 3,203,926
Patented Aug. 31, 1965

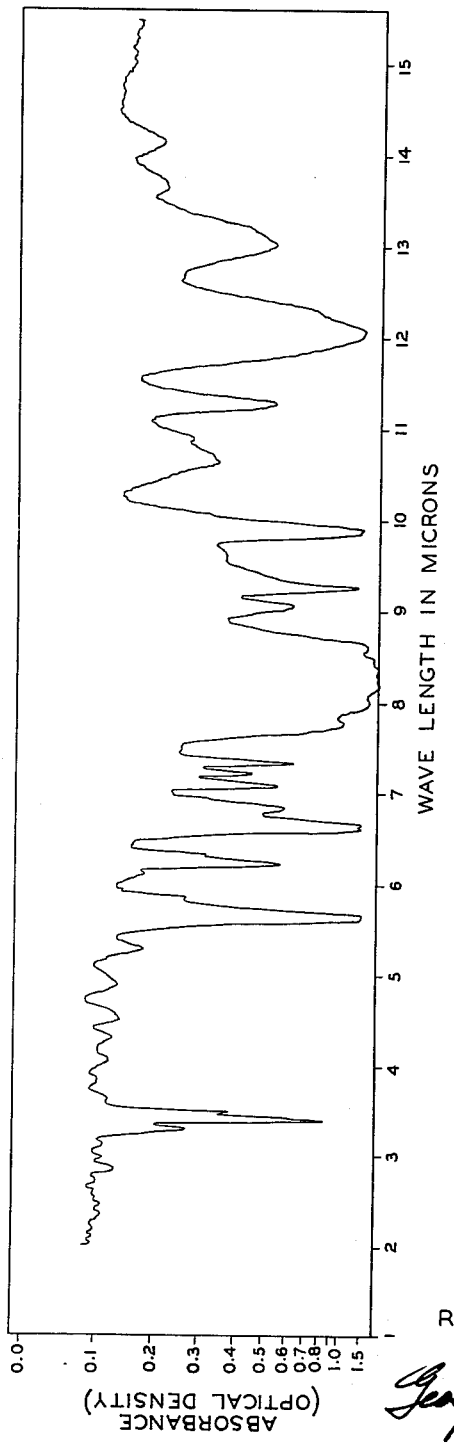

3,203,926
COPOLYCARBONATES OF DI-(BISPHENOL) ETHERS AND BISPHENOLS AND PROCESSES FOR THEIR PRODUCTION
Rudolph D. Deanin, West Hartford Township, Hartford County, Conn., and Ann V. Pinter, Morristown, N.J., assignors to Allied Chemical Corporation, New York, N.Y., a corporation of New York
Filed Sept. 12, 1961, Ser. No. 137,683
6 Claims. (Cl. 260—47)

This invention relates to the production of copolycarbonates of di-(bisphenol) ethers and bisphenols. More particularly the invention relates to polycarbonates of divalent radicals derived from a di-(bisphenol) ether and divalent radicals derived from a bisphenol, those radicals being linked by carbonate radicals.

It is known to prepare high molecular weight polycarbonates by phosgenating a reaction mixture containing a bisphenol and an alkaline acid acceptor, such as the alkali metal bisphenate of the bisphenol in aqueous solution which may also contain free caustic alkali, or an organic base such as pyridine. In the first of these procedures it is customary to introduce the phosgene into an intimate mixture or emulsion of the aqueous solution of the alkali metal bisphenate with an organic solvent for the phosgene and for at least the polycarbonates of relatively low molecular weight which are first formed. The bisphenol may or may not all be in solution in the aqueous alkaline phase prior to its reaction with the phosgene. The high molecular weight polycarbonate ultimately formed appears as a solution or gel with the organic solvent or as a solid precipitate dispersed in the reaction mixture. In the second of these procedures, employing an organic base as the acid acceptor, this also acts as a solvent for the polycarbonate and phosgene and may also serve to catalyze the reaction forming the polycarbonate. A second organic solvent for the polycarbonate and phosgene can also be present in the reaction mixture treated with the phosgene.

In carrying out these known process for the production of the bisphenol polycarbonates, it is customary, after the desired amount of phosgene gas has been introduced, to agitate the reaction mixture for a period of time to promote growth of low molecular weight polycarbonate to a higher molecular weight. A catalyst promoting this growth in molecular weight of the polycarbonate usually is introduced into the aqueous emulsion reaction mixture and, in the procedure employing an organic acid acceptor, such catalyst in addition to the organic acid acceptor is commonly added. The addition of catalyst can be made either before or after completion of the introduction of the phosgene and before the final period of stirring the reaction mixture to obtain growth in molecular weight of the polycarbonate. It is also a common expedient, in employing the above processes, to control the molecular weight of the polycarbonate by incorporating in the reaction mixture a chain terminator, such as a monohydroxy phenol, which reacts with the terminal radicals of the growing polycarbonate chains and thus serves to control their growth and to give polycarbonates of a desired molecular weight.

In operating in accordance with these known procedures it is also known to include in the reaction mixture, in addition to the bisphenol, a second dihydroxy compound, such as a polymethylene glycol, which also reacts to form a copolycarbonate of the bisphenol. In the copolycarbonates thus obtained the divalent radicals derived from this second dihydroxy compound and from the bisphenol are all linked through divalent carbonate radicals. The polycarbonates prepared by the processes of the prior art are thus distinguished from the polycarbonates prepared by the processes of our invention, in which the polymer chain contains divalent radicals derived from an alkylene di-(bisphenol) ether linked with two bisphenol radicals through divalent carbonate radicals. We have discovered polycarbonates having those novel structures, and resulting desirable characteristics, can be prepared by a novel two-stage procedure from dihaloalkanes or dihaloalkenes and the bisphenols used in the above processes for preparation of bisphenol polycarbonates and copolycarbonates.

In operating in accordance with our copending application Serial Number 137,684 with Bryce C. Oxenrider, filed as of even date herewith, a reaction mixture is prepared containing the alkali metal diphenate of a bisphenol alkane, cycloalkane or aralkane or a halogen derivative of such bisphenol containing the halogen attached to carbon in an aromatic ring, in a water solution, and an organic dihalide. Suitable dihalides are the dihaloalkanes, dihaloalkenes, dihalocycloalkanes, dihaloalkyl cycloalkanes, dihaloalkene cycloalkanes, aryl dihaloalkanes and aryl dihaloalkenes, and the dihaloalkane and dihaloalkene ethers and polyethers in which the ether oxygen is separated by at least 2 carbon atoms from each of the two halogen atoms. The reaction mixture is maintained at temperatures at which the diphenate of the bisphenol and the organic dihalide react to form an alkali metal phenate of a di-(bisphenol) ether. These ethers have the structure (1)
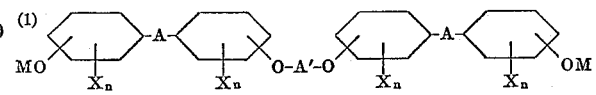

In which M is an alkali metal, A is a divalent alkane, cycloalkane or aralkane radical, A' is a divalent radical derived from an organic dihalide by removal of the two halogen atoms from a dihaloalkane, dihaloalkene, dihalocycloalkane, dihaloalkyl cycloalkane, dihaloalkene cycloalkane, aryl dihaloalkane, aryl dihaloalkene, or a dihaloalkane or dihaloalkene ether or polyether in which the ether-oxygen is separated by at least 2 carbon atoms from each of the two halogen atoms, X is an halogen atom or an alkane radical and $n$ is an integer from 0 to 4. The two radicals represented by A may be the same or different in composition.

In accordance with the present invention, the di-(bisphenol) ether produced as described above, in the form of its alkali metal diphenate or as the free di-(bisphenol) ether obtained by acidifying the alkali metal diphenate product of the first step, together with a bisphenol alkane, is reacted with phosgene employing any of the prior art processes for the production of the polycarbonates of bisphenols by phosgenating a bisphenol in the presence of an acid acceptor. The resulting copolycarbonates contain a random distribution of divalent radicals having the structures (2)
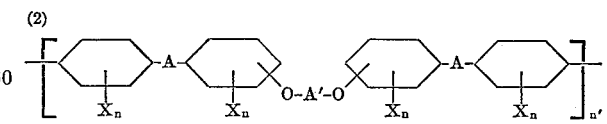

and (3)
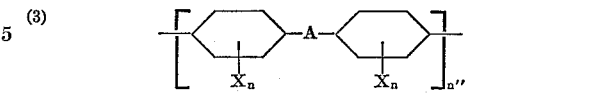

in which A, A', X and $n$ are as defined above and $n'$ and $n''$ represent integers greater than 1 and $n''$ is at least 1% and no more than 99% of the value for $n'+n''$, preferably $n''$ is 5% to 75% of the value for $n'+n''$;

these divalent radicals being linked through the divalent carbonate radicals

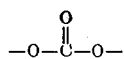

The two terminal valences of the copolymer products of our process are satisfied either by radicals derived from a chain terminator, by the —OM radical of above structure (1) or by hydroxyl radicals.

In the first step of the processes, a reaction mixture is prepared containing the bisphenol and the dihalide in at least a 2:1 mole ratio of the bisphenol to the dihalide, in an aqueous solution containing at least about the stoichiometric amount of caustic alkali required to form the alkali metal halide with all the halogen present in the dihalide. Instead of starting with the free bisphenol, the equivalent amounts of its alkali metal diphenate and the dihalide, with or without added caustic alkali can be added to water. It is not necessary that all the dihalide or the diphenate of the bisphenol, be soluble in the initial reaction mixture. Even the dihalides with quite low solubilities can be reacted with the liquid or solid dihalide intimately mixed with the aqueous phase of the reaction mixture, or a solution of the dihalide in an organic solvent can be used, intimately mixed with the aqueous solution of the diphenate. The reaction mixture thus prepared is heated, preferably at reflux temperatures until 20 to 100 mole percent of the caustic alkali required to form the alkali metal halide with the halogen of the dihaloalkane has been converted into the halide salt as shown by titration of an aliquot portion of the reaction mixture with a standard dilute hydrochloric acid solution.

In the second step of our process the diether produced in the first step is reacted with phosgene and a bisphenol to form the copolycarbonate of the diether and bisphenol. This second step can be carried out in either of two manners.

(1) To the reaction product of the first step there is added an amount of bisphenol needed in addition to bisphenol present in the reaction product of the first step to provide a ratio of 0.01 to 100 moles, preferably 2 to 10 moles, of bisphenol for every one mole of the diether present in that reaction product. Aqueous alkali solution as needed in addition to that present in the reaction product to provide the desired amount of acid acceptor, a catalyst promoting formation and growth in molecular weight of the polycarbonate and an organic solvent for the phosgene and the low molecular weight polycarbonate, all in amounts to form a reaction mixture suitable for phosgenation to convert bisphenols present as their alkali metal phenates into high molecular weight polycarbonates as taught by the art, are added to the reaction product of the first step of our process. Likewise a chain terminator to control the molecular weight of the copolycarbonate can be added to the reaction mixture treated in this second step of our process. The reaction mixture thus prepared is treated under conditions with respect to reaction temperature, introduction of the phosgene into the reaction mixture and post phosgenation period for growth in molecular weight of the polycarbonate initially formed, taught by the prior art for the production of bisphenol polycarbonates by phosgenating intimate mixtures or emulsions of aqueous alkali and organic solvent containing one or more bisphenols to form their polycarbonates.

(2) Instead of employing the reaction product of the first step of our process in preparing the reaction mixture to be phosgenated as described above, the di-(bisphenol) ether produced by the first step may be isolated from the reaction product and in the second step of our process, together with 0.01 to 100 moles, preferably 2 to 10 moles, of a bisphenol for every one mole of the di-(bisphenol) ether can be mixed with an organic base, and this mixture phosgenated in the manners known to the prior art for producing the polycarbonates of bisphenols by their phosgenation in the presence of an organic base acid acceptor.

We prefer, particularly when the dihalide is one which is relatively inactive or slow to react with the bisphenate, to employ for the second step of our process the first of the above procedures in which a mixture or emulsion of aqueous alkali solution and organic solvent serves as the reaction medium for the production of bisphenol polycarbonates. In the first step excess bisphenate and free caustic alkali, present in the reaction mixture over the stoichiometric 2:1 mole ratio of bisphenate to dihalide, promotes the reaction to form the diether, and the unreacted bisphenate is then reacted with the diether in the second step of our process to form the copolycarbonate.

Whichever of the above two types of processes are employed in the second step, the diether produced in the first step and a bisphenol are reacted with phosgene in the presence of an acid acceptor and organic solvent for the phosgene and at least the low molecular weight bisphenol carbonates and polycarbonates initially formed. It is preferred to have present a catalyst promoting the reaction of the phosgene with the bisphenol alkane and the diether to form their copolycarbonates and promote growth of the copolycarbonate to high molecular weights. The phosgene is bubbled into and absorbed in the reaction mixture while maintaining it at a suitable reaction temperature, preferably of about 20° C. to about 35° C. Following introduction of the phosgene, the reaction mixture is stirred and maintained at reaction temperature for a period of post phosgenation growth in molecular weight of the polycarbonate. The catalyst for the production and growth in molecular weight of the polycarbonate can be added to the reaction mixture either before or following the introduction of the phosgene and before the post phosgenation treatment. A chain terminator serving to regulate and control the molecular weight of the polycarbonate product can be added before, during or after the introduction of the phosgene and prior to the post phosgenation treatment. Suitable catalysts include quaternary ammonium bases or tertiary amines. Pyridine can serve both as an acid acceptor and catalyst. Suitable chain terminators include the monohydroxy phenols and substituted phenols, such as phenol or tertiary butyl phenol, employed under the conditions and amounts known to the prior art for producing bisphenol polycarbonates.

Examples of the bisphenols from which their di-(bisphenol) ethers and the copolycarbonates with the di-ethers can be prepared by the processes of our invention include, but are not limited to, the following:

2,2-bis(4-hydroxyphenyl) propane (commonly known as bisphenol-A),
bis(4-hydroxyphenyl) methane,
1,1-bis(4-hydroxyphenyl) cyclohexane,
1,1-bis(4-hydroxy-3-methylphenyl) cyclohexane,
2,2-bis(2-hydroxy-4-tert-butylphenyl) propane,
3,4-bis(4-hydroxyphenyl) hexane,
1,1-bis(4-hydroxyphenyl)-1-phenyl ethane,
2,2-bis(4-hydroxyphenyl) butane,
2,2-bis(4-hydroxphenyl) pentane,
3,3-bis(4-hydroxyphenyl) pentane,
2,2-bis(4-hydroxyphenyl -3-methyl butane,
2,2-bis(4-hydroxyphenyl) hexane,
2,2-bis(4-hydroxyphenyl)-4-methyl pentane,
2,2-bis(4-hydroxyphenyl) heptane,
4,4-bis(4-hydroxyphenyl) heptane,
2,2-bis(4-hydroxyphenyl) tridecane, and
1,4-bis(4-hydroxycumyl) benzene as well as the halogen derivatives of those bisphenols, e.g., 2,2-bis(4-hydroxy-3-chlorophenyl) propane,
2,2-bis(4-hydroxy-3,5-dibromphenyl) propane and
1,4-bis(4-hydroxycumyl) tetrachlorobenzene.

the infra-red spectrum of a film cast from this solution. It shows the peak at 5.6–5.7 microns wave length due to the $$-O-C-O-$$
$$\parallel$$
$$O$$

radical and the shoulders at 8.05–8.1 and at 9.55–9.6 microns wave lengths due to the presence of the aromatic-aliphatic ether groups. These particularly characterize the copolycarbonates of our invention.

One hundred cc. of the foregoing solution of the copolycarbonate in methylene chloride was mixed first with 70 cc. acetone and then with 100 cc. methanol to precipitate 93% of its solids content as a fine white powder, which was filtered off, washed with water and dried. An X-ray powder diagram of the thus recovered copolymer showed practically no crystallinity. The homopolymers of the bisphenol polycarbonate on the other hand show considerable crystallinity when similarly precipitated from their solution in methylene chloride. The powdered polymer had an intrinsic viscosity of 0.512, corresponding to a molecular weight of 23,000, and a polymer in which the values for the $n'$ and $n''$ of Formulae 2 and 3 was about 17 and 13, respectively.

*Examples 2–12.*—The procedure of Example 1 was followed with the following changes in Step 1. The ethylene bromide was substituted by other organic dihalides in the mole ratios of the sodium diphenate of bisphenol-A to the dihalide shown in the following Table I. The reaction mixture of diphenate and dihalide and aqueous caustic soda was heated at reflux temperature (except as noted) for the times shown in Table I to obtain the percent reaction of the dihalide with the sodium diphenate shown in the table.

Following reaction of the dihalide and the diphenate to form the di-(bisphenate) ether, in Step 2 the additional caustic soda and the methylene chloride and benzyl triethyl ammonium chloride were added and the stirred emulsion was treated with the phosgene gas, employing the same amounts of materials and reaction conditions as in Step 2 of Example 1. The resulting solution of copolycarbonate was likewise treated as in that example to obtain the dry solution of copolycarbonate from which films were cast and to recover a portion of the copolymer as the solid dry material for determination of its intrinsic viscosity. Table II shows the percent of theory yields of copolycarbonate in the methylene chloride solution, the percent $n''$ of $n'+n''$ in that copolycarbonate and the ultimate elongation and ultimate tensile strength of the several films produced therefrom. The intrinsic viscosities of the copolycarbonates precipitated from that solution and the values for $n'$ and $n''$ of these precipitated products are also shown.

*Table II*

| Example | Yield (percent) | Percent $n''$ | UE (percent) | UTS (p.s.i.) | $N_i$ | $n'$ | $n''$ |
|---|---|---|---|---|---|---|---|
| 2 | 80 | 40 | 7 | 9,087 | 1.47 | 44 | 66 |
| 3 | 72 | 45 | 5 | 7,350 | 0.67 | 24 | 19 |
| 4 | 92 | 65 | 9 | 10,900 | 1.245 | 31 | 58 |
| 5 | 90 | 50 | 12 | 6,350 | 0.602 | 32.5 | 32.5 |
| 6 | 74 | 47 | 5 | 2,660 | 0.44 | 13 | 12 |
| 7 | 93 | 60 | 6 | 6,550 | 0.803 | 21 | 32 |
| 8 | 94 | 69 | 12 | 9,050 | 0.91 | 19 | 42 |
| 9 | 85 | 68 | 7 | 9,050 | 1.28 | 30 | 63 |
| 10 | 74 | 70 | 10 | 10,100 | 1.02 | 21 | 49 |
| 11 | 87 | 80 | 7 | 11,400 | 1.255 | 18 | 72 |
| 12 | 61 | 72 | -------- | -------- | 0.391 | 6 | 16 |

*Examples 13–15.*—The procedure of Example 1 was repeated replacing the ethylene bromide employed for reaction with the bisphenol-A by varied amounts of 1,10-dibromodecane and heating the initial reaction mixture in the first step at reflux temperature for 8 hours. The following Table III shows the mole ratios of diphenate of bisphenol-A to dibromodecane employed, the percent dibromodecane reacted with the diphenate in the first stage, and the properties of the films cast from the methylene chloride solution of the copolycarbonate.

*Table III*

| Example | Mole ratio, diphenate/dihalide | Percent reacted | UE (percent) | UTS (p.s.i.) |
|---|---|---|---|---|
| 13 | 1/0.1 | 99 | 5 | 8,021 |
| 14 | 1/0.25 | 56 | 21 | 3,810 |
| 15 | 1/0.5 | 43 | 160 | 2,177 |

*Table I*

| Example | Dihalide | Mole ratio, diphenate/dihalide | Reflux time (hours) | Percent reacted |
|---|---|---|---|---|
| 2 | 1,2-dibromopropane | 3/1 | 3.0 | 61 |
| 3 | 1,3-dibromopropane | 3/1 | 0.5 | 82 |
| 4 | 1,2-dibromobutane | 4/1 | 2.0 | 69 |
| 5 | 1,4-dibromobutane | 4/1 | 0.5 | 100 |
| 6 | 1,4-dichlorobutene-2 | 3.8/1 | *1.0 | 100 |
| 7 | 1,4-dibromopentane | 5/1 | 0.5 | 100 |
| 8 | 1,5-dibromopentane | 5/1 | 0.5 | 78 |
| 9 | Bis(2-bromoethyl) ether | 5.2/1 | 0.5 | 84 |
| 10 | 2,3-dibromohexane | 5.9/1 | 0.5 | 87 |
| 11 | 1,10-dibromodecane | 10/1 | 1.0 | 100 |
| 12 | p,p'-Dibromoxylene | 7.1/1 | 0.5 | 100 |

*Reaction mixture heated at 30° C.

With increasing mole ratios of the 1,10-dibromodecane to the diphenate of bisphenol-A employed in carrying out the process there is a marked increase in internal plasticization of the resulting copolycarbonates. Films produced therefrom can thus be varied from tough, inextensible films to soft, pliable, extensible films.

Table IV gives the values for percent $n''$ of $n'+n''$ in the methylene chloride solution from which the films were cast and the intrinsic viscosities and values of $n'$ and $n''$ of the copolymers precipitated from those solutions by acetone and methyl alcohol.

*Table IV*

| Example | Percent $n''$ | $N_i$ | $n'$ | $n''$ |
|---|---|---|---|---|
| 13 | 80 | 1.040 | 13 | 53 |
| 14 | 72 | 1.090 | 20 | 50 |
| 15 | 47 | 1.250 | 25 | 57 |

*Examples 16–23.*—The procedure of Example 1 was repeated employing 4.7 gm. and 23.5 gm. ethylene bromide and 57 gm. bisphenol-A in the first stage of the proc- In addition to the numerous organic dihalides used in the examples, the following can be employed in carrying out the processes of our invention to form their respective copolycarbonates with the various bisphenols:

1,6-dibromo-3-hexene,
1,4-dichlorocyclohexane,
1,4-dichlorocyclopentane,
1,4-dichloromethyl cyclohexane,
1,4-dichloroethyl cyclohexane
1,4-bis(4-chloro-2-butenyl) cyclohexane,
1,4-bis(3-bromopropenyl) benzene,
1,4-bis(4-bromo-2-butenyl) benzene,
1,4-bis(β-bromoethoxy) benzene,
1,4-bis(β-bromoethoxyethyl) benzene,
1,4-bis(3-bromopropenoxy) benzene,
1,4-bis(3-bromopropenoxyethyl) benzene.

Preferably, because of their availability and lower costs, we prefer to employ those dihalides in which the halogen is chlorine. Nevertheless, the dihalides of the other halogens than those for which particular examples are given throughout this specification, can be used in the processes of our invention. Furthermore, we prefer to employ the dihaloalkanes containing a bridge of 1 to 12 carbon atoms between the two halogen atoms and the dihaloalkane ethers or polyethers containing a bridge of 4 to 12 carbon atoms interrupted by ether-oxygen in which the ether-oxygen is separated by at least 2 carbon atoms from each of the two halogen atoms.

The copolycarbonates produced by the processes of our invention are particularly suitable for the production of films. By varying the bisphenol and organic dihalide employed in the first step and the amount or character of the bisphenol reacted with the di-(bisphenol) ether, the properties of the films can be varied to adapt them for particular uses. However, the use of our copolycarbonates not limited to the production of films. They are useful for the production of molded articles, fibers, by spinning solutions or melts of the copolycarbonates, or coating compositions. For the latter purpose the copolycarbonates produced by the processes of our invention can be reacted with drying oils, such as dehydrated castor oil, to modify the solubility characteristics of the copolycarbonates in solvents commonly used for preparing coating compositions and the character of the films deposited on substrates by those compositions.

Our invention is more particularly described and illustrated in the following examples. The intrinsic viscosities and molecular weights given are those calculated from the effluent times of an 0.1% solution of the polycarbonate in ethylene chloride and of the ethylene chloride solvent measured in an Ostwald-Fenske viscometer at 25° C., using the following equations:

$$N_r = \frac{\frac{T}{T'} - 1}{C}$$

$$N_i = N_r - 0.02$$

$$MW^{0.83} = \frac{N_i}{1.23 \times 10^{-4}}$$

In these equations T and T' are the effluent times of the solution of the polycarbonate and of the solvent, respectively, C is the concentration of the polycarbonate in the solution in grams/100 cc. of solvent, and MW is the molecular weight of the polycarbonate.

Example 1.—Step 1: A reaction vessel fitted with a stirrer, reflux condenser, thermometer and a gas inlet dip tube was charged with 500 cc. of water in which 21 gm. of a 95% caustic soda was dissolved. To this solution containing .5 mole NaOH, there was added 57 gm. (.25 mole) of bisphenol-A, which reacted with the caustic soda to form a warm, aqueous solution of the sodium bisphenate. Ethylene bromide, amounting to 23.5 gm. (.125 mole), was then added and the mixture was stirred and heated at reflux temperature of about 100° C. for a period of one hour. At this time titration of an aliquot portion of the reaction mixture with a standardized, dilute aqueous hydrochloric acid solution showed 72% of theoretical reaction of the ethylene bromide with the sodium bisphenate to form sodium bromide and the ethylene diether of the bisphenol-A in accordance with the following equation:

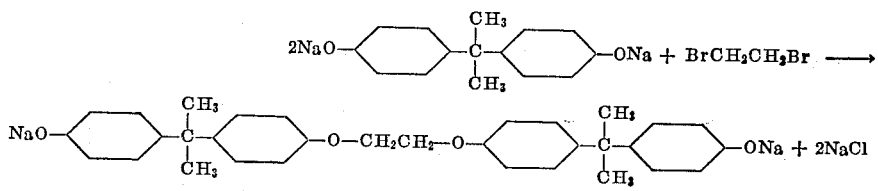

The reaction product contained about .78/1 mole ratio of bisphenol-A to the alkylene di(bisphenol alkane) ether, both in the form of their sodium diphenates. It contained a white precipitate of the diether.

Step 2: The reaction product of Step 1 was cooled to room temperature and 31.5 gm. of 95% caustic soda (0.75 mole NaOH), 500 cc. methylene chloride and 6.4 cc. of a 10% solution of benzyl triethyl ammonium chloride in solution in 500 cc. methylene chloride were added with stirring of the reaction mixture to maintain an emulsion of the aqueous and methylene chloride phases. Nitrogen was passed through the dip tube into the reaction vessel for 15 minutes to remove air and to provide an atmosphere of inert gas. With continued stirring, the flow of nitrogen gas was discontinued and 27.5 gm. of phosgene was bubbled into the reaction mixture at a substantially uniform rate over a period of one hour, with the reaction mixture maintained at about 30° C. Following introduction of the phosgene the reaction mixture was further stirred for another hour at 30° C.

The solution of copolycarbonate in methylene chloride in the reaction product was separated from the aqueous phase, diluted with 500 cc. of additional methylene chloride, and washed, first with a dilute aqueous hydrochloric acid and then with water. The washed solution of copolymer was dried by addition of anhydrous calcium chloride and then filtered. An 80% theoretical yield of copolycarbonate in this solution was obtained, based on the amounts of ethylene bromide reacted in Step 1 and of bisphenol-A supplied to the initial reaction mixture. The copolymer contained the divalent radicals represented by above formulae 2 and 3 in which $n''$ is about 44% of $n' + n''$, linked to one another through the divalent carbonate radical.

A portion of this copolymer solution in methylene chloride was cast to form a film 1 mil thick. This film was clear, colorless, glossy and tough. It had an ultimate tensile strength (UTS) of 64.67 p.s.i. and ultimate elongation (UE) of 6%. The accompanying drawing shows the infra-red spectrum of a film cast from this solution. It shows the peak at 5.6–5.7 microns wave length due to the $$-\text{O}-\underset{\underset{\text{O}}{\|}}{\text{C}}-\text{O}-$$

radical and the shoulders at 8.05–8.1 and at 9.55–9.6 microns wave lengths due to the presence of the aromatic-aliphatic ether groups. These particularly characterize the copolycarbonates of our invention.

One hundred cc. of the foregoing solution of the copolycarbonate in methylene chloride was mixed first with 70 cc. acetone and then with 100 cc. methanol to precipitate 93% of its solids content as a fine white powder, which was filtered off, washed with water and dried. An X-ray powder diagram of the thus recovered copolymer showed practically no crystallinity. The homopolymers of the bisphenol polycarbonate on the other hand show considerable crystallinity when similarly precipitated from their solution in methylene chloride. The powdered polymer had an intrinsic viscosity of 0.512, corresponding to a molecular weight of 23,000, and a polymer in which the values for the $n'$ and $n''$ of Formulae 2 and 3 was about 17 and 13, respectively.

*Examples 2–12.*—The procedure of Example 1 was followed with the following changes in Step 1. The ethylene bromide was substituted by other organic dihalides in the mole ratios of the sodium diphenate of bisphenol-A to the dihalide shown in the following Table I. The reaction mixture of diphenate and dihalide and aqueous caustic soda was heated at reflux temperature (except as noted) for the times shown in Table I to obtain the percent reaction of the dihalide with the sodium diphenate shown in the table.

*Table I*

| Example | Dihalide | Mole ratio, diphenate/dihalide | Reflux time (hours) | Percent reacted |
|---|---|---|---|---|
| 2 | 1,2-dibromopropane | 3/1 | 3.0 | 61 |
| 3 | 1,3-dibromopropane | 3/1 | 0.5 | 82 |
| 4 | 1,2-dibromobutane | 4/1 | 2.0 | 69 |
| 5 | 1,4-dibromobutane | 4/1 | 0.5 | 100 |
| 6 | 1,4-dichlorobutene-2 | 3.8/1 | *1.0 | 100 |
| 7 | 1,4-dibromopentane | 5/1 | 0.5 | 100 |
| 8 | 1,5-dibromopentane | 5/1 | 0.5 | 78 |
| 9 | Bis(2-bromoethyl) ether | 5.2/1 | 0.5 | 84 |
| 10 | 2,3-dibromohexane | 5.9/1 | 0.5 | 87 |
| 11 | 1,10-dibromodecane | 10/1 | 1.0 | 100 |
| 12 | p,p'-Dibromoxylene | 7.1/1 | 0.5 | 100 |

*Reaction mixture heated at 30° C.

Following reaction of the dihalide and the diphenate to form the di-(bisphenate) ether, in Step 2 the additional caustic soda and the methylene chloride and benzyl triethyl ammonium chloride were added and the stirred emulsion was treated with the phosgene gas, employing the same amounts of materials and reaction conditions as in Step 2 of Example 1. The resulting solution of copolycarbonate was likewise treated as in that example to obtain the dry solution of copolycarbonate from which films were cast and to recover a portion of the copolymer as the solid dry material for determination of its intrinsic viscosity. Table II shows the percent of theory yields of copolycarbonate in the methylene chloride solution, the percent $n''$ of $n'+n''$ in that copolycarbonate and the ultimate elongation and ultimate tensile strength of the several films produced therefrom. The intrinsic viscosities of the copolycarbonates precipitated from that solution and the values for $n'$ and $n''$ of these precipitated products are also shown.

*Table II*

| Example | Yield (percent) | Percent $n''$ | UE (percent) | UTS (p.s.i.) | $N_i$ | $n'$ | $n''$ |
|---|---|---|---|---|---|---|---|
| 2 | 80 | 40 | 7 | 9,087 | 1.47 | 44 | 66 |
| 3 | 72 | 45 | 5 | 7,350 | 0.67 | 24 | 19 |
| 4 | 92 | 65 | 9 | 10,900 | 1.245 | 31 | 58 |
| 5 | 90 | 50 | 12 | 6,350 | 0.602 | 32.5 | 32.5 |
| 6 | 74 | 47 | 5 | 2,660 | 0.44 | 13 | 12 |
| 7 | 93 | 60 | 6 | 6,550 | 0.803 | 21 | 32 |
| 8 | 94 | 69 | 12 | 9,050 | 0.91 | 19 | 42 |
| 9 | 85 | 68 | 7 | 9,050 | 1.28 | 30 | 63 |
| 10 | 74 | 70 | 10 | 10,100 | 1.02 | 21 | 49 |
| 11 | 87 | 80 | 7 | 11,400 | 1.255 | 18 | 72 |
| 12 | 61 | 72 | | | 0.391 | 6 | 16 |

*Examples 13–15.*—The procedure of Example 1 was repeated replacing the ethylene bromide employed for reaction with the bisphenol-A by varied amounts of 1,10-dibromo decane and heating the initial reaction mixture in the first step at reflux temperature for 8 hours. The following Table III shows the mole ratios of diphenate of bisphenol-A to dibromodecane employed, the percent dibromodecane reacted with the diphenate in the first stage, and the properties of the films cast from the methylene chloride solution of the copolycarbonate.

*Table III*

| Example | Mole ratio, diphenate/dihalide | Percent reacted | UE (percent) | UTS (p.s.i.) |
|---|---|---|---|---|
| 13 | 1/0.1 | 99 | 5 | 8,021 |
| 14 | 1/0.25 | 56 | 21 | 3,810 |
| 15 | 1/0.5 | 43 | 160 | 2,177 |

With increasing mole ratios of the 1,10-dibromodecane to the diphenate of bisphenol-A employed in carrying out the process there is a marked increase in internal plasticization of the resulting copolycarbonates. Films produced therefrom can thus be varied from tough, inextensible films to soft, pliable, extensible films.

Table IV gives the values for percent $n''$ of $n'+n''$ in the methylene chloride solution from which the films were cast and the intrinsic viscosities and values of $n'$ and $n''$ of the copolymers precipitated from those solutions by acetone and methyl alcohol.

*Table IV*

| Example | Percent $n''$ | $N_i$ | $n'$ | $n''$ |
|---|---|---|---|---|
| 13 | 80 | 1.040 | 13 | 53 |
| 14 | 72 | 1.090 | 20 | 50 |
| 15 | 47 | 1.250 | 25 | 57 |

*Examples 16–23.*—The procedure of Example 1 was repeated employing 4.7 gm. and 23.5 gm. ethylene bromide and 57 gm. bisphenol-A in the first stage of the proc- In addition to the numerous organic dihalides used in the examples, the following can be employed in carrying out the processes of our invention to form their respective copolycarbonates with the various bisphenols:

1,6-dibromo-3-hexene,
1,4-dichlorocyclohexane,
1,4-dichlorocyclopentane,
1,4-dichloromethyl cyclohexane,
1,4-dichloroethyl cyclohexane
1,4-bis(4-chloro-2-butenyl) cyclohexane,
1,4-bis(3-bromopropenyl) benzene,
1,4-bis(4-bromo-2-butenyl) benzene,
1,4-bis($\beta$-bromoethoxy) benzene,
1,4-bis($\beta$-bromoethoxyethyl) benzene,
1,4-bis(3-bromopropenoxy) benzene,
1,4-bis(3-bromopropenoxyethyl) benzene.

Preferably, because of their availability and lower costs, we prefer to employ those dihalides in which the halogen is chlorine. Nevertheless, the dihalides of the other halogens than those for which particular examples are given throughout this specification, can be used in the processes of our invention. Furthermore, we prefer to employ the dihaloalkanes containing a bridge of 1 to 12 carbon atoms between the two halogen atoms and the dihaloalkane ethers or polyethers containing a bridge of 4 to 12 carbon atoms interrupted by ether-oxygen in which the ether-oxygen is separated by at least 2 carbon atoms from each of the two halogen atoms.

The copolycarbonates produced by the processes of our invention are particularly suitable for the production of films. By varying the bisphenol and organic dihalide employed in the first step and the amount or character of the bisphenol reacted with the di-(bisphenol) ether, the properties of the films can be varied to adapt them for particular uses. However, the use of our copolycarbonates is not limited to the production of films. They are useful for the production of molded articles, fibers, by spinning solutions or melts of the copolycarbonates, or coating compositions. For the latter purpose the copolycarbonates produced by the processes of our invention can be reacted with drying oils, such as dehydrated castor oil, to modify the solubility characteristics of the copolycarbonates in solvents commonly used for preparing coating compositions and the character of the films deposited on substrates by those compositions.

Our invention is more particularly described and illustrated in the following examples. The intrinsic viscosities and molecular weights given are those calculated from the effluent times of an 0.1% solution of the polycarbonate in ethylene chloride and of the ethylene chloride solvent as measured in an Ostwald-Fenske viscometer at 25° C., using the following equations:

$$N_r = \frac{\frac{T}{T'}-1}{C}$$

$$N_i = N_r - 0.02$$

$$MW^{0.83} = \frac{N_i}{1.23 \times 10^{-4}}$$

In these equations T and T' are the effluent times of the solution of the polycarbonate and of the solvent, respectively, C is the concentration of the polycarbonate in the solution in grams/100 cc. of solvent, and MW is the molecular weight of the polycarbonate.

Example 1.—Step 1: A reaction vessel fitted with a stirrer, reflux condenser, thermometer and a gas inlet dip tube was charged with 500 cc. of water in which 21 gm. of a 95% caustic soda was dissolved. To this solution containing .5 mole NaOH, there was added 57 gm. (.25 mole) of bisphenol-A, which reacted with the caustic soda to form a warm, aqueous solution of the sodium bisphenate. Ethylene bromide, amounting to 23.5 gm. (.125 mole), was then added and the mixture was stirred and heated at reflux temperature of about 100° C. for a period of one hour. At this time titration of an aliquot portion of the reaction mixture with a standardized, dilute aqueous hydrochloric acid solution showed 72% of theoretical reaction of the ethylene bromide with the sodium bisphenate to form sodium bromide and the ethylene diether of the bisphenol-A in accordance with the following equation:

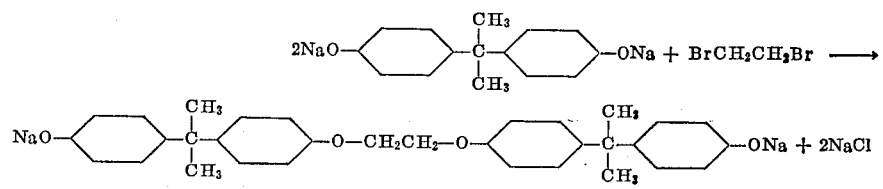

The reaction product contained about .78/1 mole ratio of bisphenol-A to the alkylene di(bisphenol alkane) ether, both in the form of their sodium diphenates. It contained a white precipitate of the diether.

Step 2: The reaction product of Step 1 was cooled to room temperature and 31.5 gm. of 95% caustic soda (0.75 mole NaOH), 500 cc. methylene chloride and 6.4 cc. of a 10% solution of benzyl triethyl ammonium chloride in solution in 500 cc. methylene chloride were added with stirring of the reaction mixture to maintain an emulsion of the aqueous and methylene chloride phases. Nitrogen was passed through the dip tube into the reaction vessel for 15 minutes to remove air and to provide an atmosphere of inert gas. With continued stirring, the flow of nitrogen gas was discontinued and 27.5 gm. of phosgene was bubbled into the reaction mixture at a substantially uniform rate over a period of one hour, with the reaction mixture maintained at about 30° C. Following introduction of the phosgene the reaction mixture was further stirred for another hour at 30° C.

The solution of copolycarbonate in methylene chloride in the reaction product was separated from the aqueous phase, diluted with 500 cc. of additional methylene chloride, and washed, first with a dilute aqueous hydrochloric acid and then with water. The washed solution of copolymer was dried by addition of anhydrous calcium chloride and then filtered. An 80% theoretical yield of copolycarbonate in this solution was obtained, based on the amounts of ethylene bromide reacted in Step 1 and of bisphenol-A supplied to the initial reaction mixture. The copolymer contained the divalent radicals represented by above formulae 2 and 3 in which $n''$ is about 44% of $n'+n''$, linked to one another through the divalent carbonate radical.

A portion of this copolymer solution in methylene chloride was cast to form a film 1 mil thick. This film was clear, colorless, glossy and tough. It had an ultimate tensile strength (UTS) of 64.67 p.s.i. and ultimate elongation (UE) of 6%. The accompanying drawing shows the infra-red spectrum of a film cast from this solution. It shows the peak at 5.6–5.7 microns wave length due to the $$-O-\underset{\underset{O}{\|}}{C}-O-$$

radical and the shoulders at 8.05–8.1 and at 9.55–9.6 microns wave lengths due to the presence of the aromatic-aliphatic ether groups. These particularly characterize the copolycarbonates of our invention.

One hundred cc. of the foregoing solution of the copolycarbonate in methylene chloride was mixed first with 70 cc. acetone and then with 100 cc. methanol to precipitate 93% of its solids content as a fine white powder, which was filtered off, washed with water and dried. An X-ray powder diagram of the thus recovered copolymer showed practically no crystallinity. The homopolymers of the bisphenol polycarbonate on the other hand show considerable crystallinity when similarly precipitated from their solution in methylene chloride. The powdered polymer had an intrinsic viscosity of 0.512, corresponding to a molecular weight of 23,000, and a polymer in which the values for the $n'$ and $n''$ of Formulae 2 and 3 was about 17 and 13, respectively.

*Examples 2–12.*—The procedure of Example 1 was followed with the following changes in Step 1. The ethylene bromide was substituted by other organic dihalides in the mole ratios of the sodium diphenate of bisphenol-A to the dihalide shown in the following Table I. The reaction mixture of diphenate and dihalide and aqueous caustic soda was heated at reflux temperature (except as noted) for the times shown in Table I to obtain the percent reaction of the dihalide with the sodium diphenate shown in the table.

Following reaction of the dihalide and the diphenate to form the di-(bisphenate) ether, in Step 2 the additional caustic soda and the methylene chloride and benzyl triethyl ammonium chloride were added and the stirred emulsion was treated with the phosgene gas, employing the same amounts of materials and reaction conditions as in Step 2 of Example 1. The resulting solution of copolycarbonate was likewise treated as in that example to obtain the dry solution of copolycarbonate from which films were cast and to recover a portion of the copolymer as the solid dry material for determination of its intrinsic viscosity. Table II shows the percent of theory yields of copolycarbonate in the methylene chloride solution, the percent $n''$ of $n'+n''$ in that copolycarbonate and the ultimate elongation and ultimate tensile strength of the several films produced therefrom. The intrinsic viscosities of the copolycarbonates precipitated from that solution and the values for $n'$ and $n''$ of these precipitated products are also shown.

*Table II*

| Example | Yield (percent) | Percent $n''$ | UE (percent) | UTS (p.s.i.) | $N_i$ | $n'$ | $n''$ |
|---|---|---|---|---|---|---|---|
| 2 | 80 | 40 | 7 | 9,087 | 1.47 | 44 | 66 |
| 3 | 72 | 45 | 5 | 7,350 | 0.67 | 24 | 19 |
| 4 | 92 | 65 | 9 | 10,900 | 1.245 | 31 | 58 |
| 5 | 90 | 50 | 12 | 6,350 | 0.602 | 32.5 | 32.5 |
| 6 | 74 | 47 | 5 | 2,660 | 0.44 | 13 | 12 |
| 7 | 93 | 60 | 6 | 6,550 | 0.803 | 21 | 32 |
| 8 | 94 | 69 | 12 | 9,050 | 0.91 | 19 | 42 |
| 9 | 85 | 68 | 7 | 9,050 | 1.28 | 30 | 63 |
| 10 | 74 | 70 | 10 | 10,100 | 1.02 | 21 | 49 |
| 11 | 87 | 80 | 7 | 11,400 | 1.255 | 18 | 72 |
| 12 | 61 | 72 |  |  | 0.391 | 6 | 16 |

*Examples 13–15.*—The procedure of Example 1 was repeated replacing the ethylene bromide employed for reaction with the bisphenol-A by varied amounts of 1,10-dibromo decane and heating the initial reaction mixture in the first step at reflux temperature for 8 hours. The following Table III shows the mole ratios of diphenate of bisphenol-A to dibromodecane employed, the percent dibromodecane reacted with the diphenate in the first stage, and the properties of the films cast from the methylene chloride solution of the copolycarbonate.

*Table III*

| Example | Mole ratio, diphenate/dihalide | Percent reacted | UE (percent) | UTS (p.s.i.) |
|---|---|---|---|---|
| 13 | 1/0.1 | 99 | 5 | 8,021 |
| 14 | 1/0.25 | 56 | 21 | 3,810 |
| 15 | 1/0.5 | 43 | 160 | 2,177 |

*Table I*

| Example | Dihalide | Mole ratio, diphenate/dihalide | Reflux time (hours) | Percent reacted |
|---|---|---|---|---|
| 2 | 1,2-dibromopropane | 3/1 | 3.0 | 61 |
| 3 | 1,3-dibromopropane | 3/1 | 0.5 | 82 |
| 4 | 1,2-dibromobutane | 4/1 | 2.0 | 69 |
| 5 | 1,4-dibromobutane | 4/1 | 0.5 | 100 |
| 6 | 1,4-dichlorobutene-2 | 3.8/1 | *1.0 | 100 |
| 7 | 1,4-dibromopentane | 5/1 | 0.5 | 100 |
| 8 | 1,5-dibromopentane | 5/1 | 0.5 | 78 |
| 9 | Bis(2-bromoethyl) ether | 5.2/1 | 0.5 | 84 |
| 10 | 2,3-dibromohexane | 5.9/1 | 0.5 | 87 |
| 11 | 1,10-dibromodecane | 10/1 | 1.0 | 100 |
| 12 | p,p'-Dibromoxylene | 7.1/1 | 0.5 | 100 |

*Reaction mixture heated at 30° C.

With increasing mole ratios of the 1,10-dibromodecane to the diphenate of bisphenol-A employed in carrying out the process there is a marked increase in internal plasticization of the resulting copolycarbonates. Films produced therefrom can thus be varied from tough, inextensible films to soft, pliable, extensible films.

Table IV gives the values for percent $n''$ of $n'+n''$ in the methylene chloride solution from which the films were cast and the intrinsic viscosities and values of $n'$ and $n''$ of the copolymers precipitated from those solutions by acetone and methyl alcohol.

*Table IV*

| Example | Percent $n''$ | $N_i$ | $n'$ | $n''$ |
|---|---|---|---|---|
| 13 | 80 | 1.040 | 13 | 53 |
| 14 | 72 | 1.090 | 20 | 50 |
| 15 | 47 | 1.250 | 25 | 57 |

*Examples 16–23.*—The procedure of Example 1 was repeated employing 4.7 gm. and 23.5 gm. ethylene bromide and 57 gm. bisphenol-A in the first stage of the proc- In addition to the numerous organic dihalides used in the examples, the following can be employed in carrying out the processes of our invention to form their respective copolycarbonates with the various bisphenols:

1,6-dibromo-3-hexene,
1,4-dichlorocyclohexane,
1,4-dichlorocyclopentane,
1,4-dichloromethyl cyclohexane,
1,4-dichloroethyl cyclohexane
1,4-bis(4-chloro-2-butenyl) cyclohexane,
1,4-bis(3-bromopropenyl) benzene,
1,4-bis(4-bromo-2-butenyl) benzene,
1,4-bis($\beta$-bromoethoxy) benzene,
1,4-bis($\beta$-bromoethoxyethyl) benzene,
1,4-bis(3-bromopropenoxy) benzene,
1,4-bis(3-bromopropenoxyethyl) benzene.

Preferably, because of their availability and lower costs, we prefer to employ those dihalides in which the halogen is chlorine. Nevertheless, the dihalides of the other halogens than those for which particular examples are given throughout this specification, can be used in the processes of our invention. Furthermore, we prefer to employ the dihaloalkanes containing a bridge of 1 to 12 carbon atoms between the two halogen atoms and the dihaloalkane ethers or polyethers containing a bridge of 4 to 12 carbon atoms interrupted by ether-oxygen in which the ether-oxygen is separated by at least 2 carbon atoms from each of the two halogen atoms.

The copolycarbonates produced by the processes of our invention are particularly suitable for the production of films. By varying the bisphenol and organic dihalide employed in the first step and the amount or character of the bisphenol reacted with the di-(bisphenol) ether, the properties of the films can be varied to adapt them for particular uses. However, the use of our copolycarbonates is not limited to the production of films. They are useful for the production of molded articles, fibers, by spinning solutions or melts of the copolycarbonates, or coating compositions. For the latter purpose the copolycarbonates produced by the processes of our invention can be reacted with drying oils, such as dehydrated castor oil, to modify the solubility characteristics of the copolycarbonates in solvents commonly used for preparing coating compositions and the character of the films deposited on substrates by those compositions.

Our invention is more particularly described and illustrated in the following examples. The intrinsic viscosities and molecular weights given are those calculated from the effluent times of an 0.1% solution of the polycarbonate in ethylene chloride and of the ethylene chloride solvent as measured in an Ostwald-Fenske viscometer at 25° C., using the following equations:

$$N_r = \frac{\frac{T}{T'}-1}{C}$$

$$N_i = N_r - 0.02$$

$$MW^{0.83} = \frac{N_i}{1.23 \times 10^{-4}}$$

In these equations T and T' are the effluent times of the solution of the polycarbonate and of the solvent, respectively, C is the concentration of the polycarbonate in the solution in grams/100 cc. of solvent, and MW is the molecular weight of the polycarbonate.

*Example 1.*—Step 1: A reaction vessel fitted with a stirrer, reflux condenser, thermometer and a gas inlet dip tube was charged with 500 cc. of water in which 21 gm. of a 95% caustic soda was dissolved. To this solution containing .5 mole NaOH, there was added 57 gm. (.25 mole) of bisphenol-A, which reacted with the caustic soda to form a warm, aqueous solution of the sodium bisphenate. Ethylene bromide, amounting to 23.5 gm. (.125 mole), was then added and the mixture was stirred and heated at reflux temperature of about 100° C. for a period of one hour. At this time titration of an aliquot portion of the reaction mixture with a standardized, dilute aqueous hydrochloric acid solution showed 72% of theoretical reaction of the ethylene bromide with the sodium bisphenate to form sodium bromide and the ethylene diether of the bisphenol-A in accordance with the following equation:

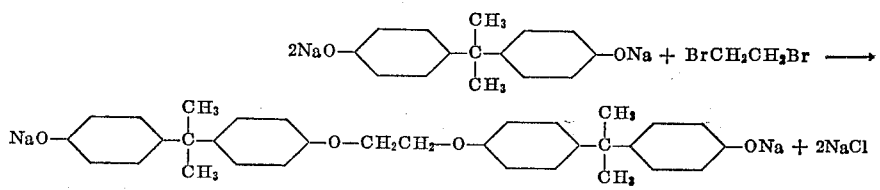

The reaction product contained about .78/1 mole ratio of bisphenol-A to the alkylene di(bisphenol alkane) ether, both in the form of their sodium diphenates. It contained a white precipitate of the diether.

Step 2: The reaction product of Step 1 was cooled to room temperature and 31.5 gm. of 95% caustic soda (0.75 mole NaOH), 500 cc. methylene chloride and 6.4 cc. of a 10% solution of benzyl triethyl ammonium chloride in solution in 500 cc. methylene chloride were added with stirring of the reaction mixture to maintain an emulsion of the aqueous and methylene chloride phases. Nitrogen was passed through the dip tube into the reaction vessel for 15 minutes to remove air and to provide an atmosphere of inert gas. With continued stirring, the flow of nitrogen gas was discontinued and 27.5 gm. of phosgene was bubbled into the reaction mixture at a substantially uniform rate over a period of one hour, with the reaction mixture maintained at about 30° C. Following introduction of the phosgene the reaction mixture was further stirred for another hour at 30° C.

The solution of copolycarbonate in methylene chloride in the reaction product was separated from the aqueous phase, diluted with 500 cc. of additional methylene chloride, and washed, first with a dilute aqueous hydrochloric acid and then with water. The washed solution of copolymer was dried by addition of anhydrous calcium chloride and then filtered. An 80% theoretical yield of copolycarbonate in this solution was obtained, based on the amounts of ethylene bromide reacted in Step 1 and of bisphenol-A supplied to the initial reaction mixture. The copolymer contained the divalent radicals represented by above formulae 2 and 3 in which $n''$ is about 44% of $n'+n''$, linked to one another through the divalent carbonate radical.

A portion of this copolymer solution in methylene chloride was cast to form a film 1 mil thick. This film was clear, colorless, glossy and tough. It had an ultimate tensile strength (UTS) of 64.67 p.s.i. and ultimate elongation (UE) of 6%. The accompanying drawing shows ess and adding phenol as a chain terminator to control molecular weight of the copolycarbonate produced by the second stage of the process. The phenol was added in varied amounts as between the several examples, but in each example at about the same rate of addition to the reaction mixture over the period during which the phosgene was introduced. Table V shows the mole ratio of diphenate to ethylene bromide in the initial reaction mixture, the amount of phenol added during the phosgenation in the second step of the process and the resulting effects of this addition of phenol on the intrinsic viscosities and molecular weights of the resulting copolycarbonates.

Table V

| Example | Mole ratio diphenate/ dihalide | Phenol (gm.) | $N_i$ | Molecular weight |
|---|---|---|---|---|
| 16 | 10/1 | 0.00 | 0.731 | 35,200 |
| 17 | 10/1 | 0.22 | 0.584 | 26,900 |
| 18 | 10/1 | 0.64 | 0.426 | 18,300 |
| 19 | 10/1 | 1.28 | 0.313 | 12,700 |
| 20 | 2/1 | 0.00 | 0.434 | 18,800 |
| 21 | 2/1 | 0.22 | 0.286 | 11,300 |
| 22 | 2/1 | 0.64 | 0.252 | 9,800 |
| 23 | 2/1 | 1.28 | 0.216 | 8,100 |

The effectiveness of this addition of the phenol chain terminator to control intrinsic viscosities and molecular weights of the copolycarbonates produced by our process permits variations in the character of the resulting products making them more suitable for various purposes, such as the production of films, sheets, molded articles or fibers by conventional procedures.

We claim:

1. As a new composition of matter a copolycarbonate characterized by containing a random distribution of divalent radicals having the structures

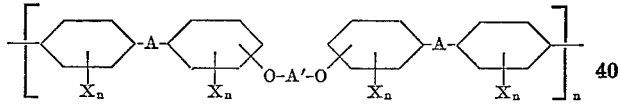

and

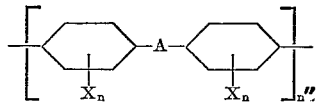

linked through divalent carbonate radicals having the structure

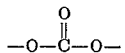

in which structures A is a radical selected from the group consisting of the divalent alkane, cycloalkane and aralkane radicals, A' is a divalent radical derived by removal of the two halogen atoms from an organic dihalide from the group consisting of the dihaloalkanes, dihaloalkenes, dihalocycloalkanes, dihaloalkyl cycloalkanes, dihaloalkene cycloalkanes, aryl dihaloalkanes, aryl dihaloalkenes, and the dihaloalkane and dihaloalkene ethers and polyethers in which the ether-oxygen is separated by at least 2 carbon atoms from each of the two halogen atoms, X is a member of the group consisting of the halogen atoms and the alkane radicals, $n$ is an integer from 0 to 4, $n'$ and $n''$ are integers greater than 1 and $n''$ is at least 1% and no more than 99% of the value for $n'+n''$.

2. The copolycarbonates of claim 1 in which $n''$ is 5% to 75% of the value for $n'+n''$.

3. The copolycarbonates of claim 1 in which A' is a straight chain alkylene radical containing 1 to 12 carbon atoms between the two oxygen atoms associated with the phenylene radicals.

4. The copolycarbonates of claim 1 in which A' is a straight chain alkylene ether radical containing 4 to 12 carbon atoms in which the ether oxygen is separated by at least 2 carbon atoms from the oxygen atoms associated with the phenylene radicals.

5. The copolycarbonates of claim 2 in which A' is a straight chain alkylene radical containing 1 to 12 carbon atoms between the two oxygen atoms associated with the phenylene radicals.

6. The copolycarbonates of claim 2 in which A' is a straight chain alkylene ether radical containing 4 to 12 carbon atoms in which the ether oxygen is separated by at least 2 carbon atoms from the oxygen atoms associated with the phenylene radicals.

References Cited by the Examiner

UNITED STATES PATENTS

| 1,950,516 | 3/34 | Prutton | 260—61 |
| 2,060,715 | 11/36 | Arvin | 260—61 |
| 3,069,386 | 12/62 | Barclay | 260—47 |

FOREIGN PATENTS 809,735  3/59  Great Britain.

OTHER REFERENCES

Schnell, Angewandte Chemie, 68, No. 20, p. 633–640, Oct. 21, 1956.

WILLIAM H. SHORT, *Primary Examiner.*

H. N. BURSTEIN, *Examiner.*

UNITED STATES PATENT OFFICE
CERTIFICATE OF CORRECTION

Patent No. 3,203,926                          August 31, 1965

Rudolph D. Deanin et al.

It is hereby certified that error appears in the above numbered patent requiring correction and that the said Letters Patent should read as corrected below.

Column 9, lines 37 to 41, for the right-hand portion of the formula reading

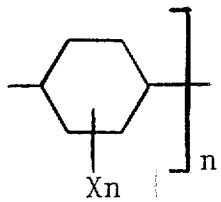  read  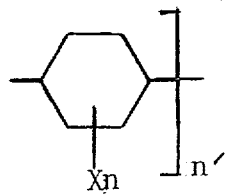

Signed and sealed this 7th day of June 1966.

(SEAL)
Attest:

ERNEST W. SWIDER                                EDWARD J. BRENNER
Attesting Officer                              Commissioner of Patents